United States Patent
Chen et al.

(10) Patent No.: US 10,505,614 B2
(45) Date of Patent: Dec. 10, 2019

(54) CSI FEEDBACK METHOD, PRECODING METHOD, AND APPARATUS

(71) Applicant: China Academy of Telecommunications Technology, Beijing (CN)

(72) Inventors: Wenhong Chen, Beijing (CN); Runhua Chen, Beijing (CN); Qiubin Gao, Beijing (CN); Tamrakar Rakesh, Beijing (CN); Hui Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/084,219

(22) PCT Filed: Feb. 20, 2017

(86) PCT No.: PCT/CN2017/074170
§ 371 (c)(1),
(2) Date: Sep. 11, 2018

(87) PCT Pub. No.: WO2017/152747
PCT Pub. Date: Sep. 14, 2017

(65) Prior Publication Data
US 2019/0074885 A1 Mar. 7, 2019

(30) Foreign Application Priority Data
Mar. 11, 2016 (CN) .......................... 2016 1 0140800

(51) Int. Cl.
*H04B 7/06* (2006.01)
*H04B 7/0456* (2017.01)
*H04L 1/00* (2006.01)

(52) U.S. Cl.
CPC ......... *H04B 7/0626* (2013.01); *H04B 7/0456* (2013.01); *H04B 7/0478* (2013.01);
(Continued)

(58) Field of Classification Search
CPC .. H04B 7/0626; H04B 7/0456; H04B 7/0478; H04B 7/0632; H04L 1/0026; H04L 1/0033; H04L 1/0036
See application file for complete search history.

(56) References Cited

U.S. PATENT DOCUMENTS

2009/0122857 A1   5/2009  Li et al.
2010/0061482 A1*  3/2010  Lee ..................... H04B 7/0671
                                                    375/296
(Continued)

FOREIGN PATENT DOCUMENTS

CN   101296207 A   10/2008
CN   103957086 A   7/2014
(Continued)

*Primary Examiner* — Janice N Tieu
(74) *Attorney, Agent, or Firm* — Kilpatrick Townsend & Stockton, LLP

(57) ABSTRACT

Disclosed are CSI feedback method, a precoding method, and an apparatus. In the present invention, after a terminal determines first precoding matrices on a first subband, the terminal obtains second precoding matrices corresponding to physical resources in the first subband according to the first precoding matrices and a column vector arrangement mode corresponding to the first precoding matrices; and then, the terminal determines CSI on a second subband according to the second precoding matrices. In the embodiment, precoding matrices are expanded according to a column vector arrangement mode, so as to obtain second precoding matrices corresponding to different physical resources; accordingly based on the second precoding matrices, CSI is measured by using the corresponding second precoding matrices on different physical resources. In the
(Continued)

embodiment, precoding matrices are expanded according to a column vector arrangement mode, so that precoding can be performed on each data flow in transmission by using different column vectors, thereby improving the robustness of a transmission solution, and obtaining a stabler precoding gain.

23 Claims, 4 Drawing Sheets

(52) U.S. Cl.
CPC ......... *H04B 7/0632* (2013.01); *H04L 1/0026* (2013.01); *H04L 1/0033* (2013.01); *H04L 1/0036* (2013.01)

(56) References Cited

U.S. PATENT DOCUMENTS

| | | | |
|---|---|---|---|
| 2011/0274188 A1* | 11/2011 | Sayana | H04B 7/0639 375/260 |
| 2012/0113830 A1* | 5/2012 | Zhu | H04B 7/024 370/252 |
| 2015/0016577 A1 | 1/2015 | Varadaharajan et al. | |
| 2015/0078312 A1* | 3/2015 | Hua | H04B 7/0456 370/329 |

FOREIGN PATENT DOCUMENTS

| | | |
|---|---|---|
| CN | 104967496 A | 10/2015 |
| WO | 2014048445 A1 | 4/2014 |

* cited by examiner

US 10,505,614 B2

CSI FEEDBACK METHOD, PRECODING METHOD, AND APPARATUS

CROSS-REFERENCE TO RELATED APPLICATIONS

This application is a National Stage of International Application No. PCT/CN2017/074170, filed Feb. 20, 2017, which claims the benefit of Chinese Patent Application No. 201610140800.2, filed with the Chinese Patent Office on Mar. 11, 2016, and entitled "A method and apparatus for feeding back CSI, and a pre-coding method and apparatus", both of which are hereby incorporated by reference in their entireties.

FIELD

The present invention relates to the field of communications, and particularly to a method and apparatus for feeding back CSI, and a pre-coding method and apparatus.

BACKGROUND

Mobility and a wideband has become a development trend of modern communication technologies, and the $3^{rd}$ Generation Partnership Project (3GPP) has been devoted to a long Term Evolution (LTE) system evolving from a 3G system with the aim of developing the 3GPP radio access technologies toward a high data ratio, a short delay, and optimized packet data applications. The Multi-input Multi-Output (MIMO) technology at the physical layer has become one of crucial technologies in the current mobile communication system due to a number of advantages thereof, for example, the capacity of the system is extended through space division multiplexing of multiple antennas, the throughput of the system is improved using a multiplexing gain of multiple antennas, etc.

As the capacity is extended, interference also becomes higher accordingly due to the correlation between channels in a channel matrix, and if a base station can obtain somehow some Channel State Information (CSI) (which can be an instantaneous value, or can be short-term or middle- to long-term statistic information, then it may optimize power, rates, and even transmit directions applied to respective data streams in some preprocessing scheme, and possibly a part or all of interference between the data streams may be eliminated in advance at a terminal through preprocessing, thus achieving higher performance.

Accordingly it is highly desirable in the industry to improve the extent of matching between the CSI fed back by the terminal, and a channel state.

SUMMARY

Embodiments of the invention provide a method and apparatus for feeding back CSI, and a pre-coding method and apparatus so as to improve the extent of matching between CSI and a channel state.

An embodiment of the invention provides a method for feeding back CSI, the method including:

determining, by a terminal, a first pre-coding matrix in a first sub-band:

determining, by the terminal, a second pre-coding matrix corresponding to a physical resource in the first sub-band according to the first pre-coding matrix, and an arrangement pattern of column vectors corresponding to the first pre-coding matrix:

determining, by the terminal, a Channel Quality Indicator (CQI) in a second sub-band according to the second pre-coding matrix; and feeding back, by the terminal, CSI including the CQI.

In one embodiment, determining, by the terminal, the Channel Quality Indicator (CQI) in the second sub-band according to the second pre-coding matrix includes:

determining, by the terminal, a second pre-coding matrix corresponding to a physical resource in the second sub-band according to the second pre-coding matrix corresponding to the physical resource in the first sub-band, wherein a physical resource corresponds to a second pre-coding matrix; and determining, by the terminal, a CQI in the second sub-band according to the second pre-coding matrix corresponding to the physical resource in the second sub-band.

In one embodiment, determining, by the terminal, the second pre-coding matrix corresponding to the physical resource in the first sub-band according to the first pre-coding matrix, and the arrangement pattern of column vectors corresponding to the first pre-coding matrix includes:

determining, by the terminal, the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

In one embodiment, the correspondence relationship between an arrangement pattern of column vectors corresponding to the first pre-coding matrix, and a physical resource in the first sub-band is that:

an i-th physical resource in the first sub-band corresponds to a k-th arrangement pattern of column vectors corresponding to the first pre-coding matrix, wherein:

$k=i \mod K$, wherein $i=0, 1, 2 \ldots N$, $k=0, 1, 2, 3, \ldots, K-1$, K is the number of arrangement patterns of column vectors corresponding to the first pre-coding matrix, and N is the number of physical resources in the first sub-band; or $k=\mathrm{ceil}(i/v) \mod K$, wherein $\mathrm{ceil}(i/v)$ represents the minimum integer no less than $i/v$, $v=RI$, or v is the number of antenna ports, $i=0, 1, 2 \ldots N$, $k=0, 1, 2, 3, \ldots, K-1$, K is the number of arrangement patterns of column vectors corresponding to the first pre-coding matrix, and N is the number of physical resources in the first sub-band.

In one embodiment, the first sub-band includes one or more PRBs; and the second sub-band is the same as the first sub-band; or the second sub-band includes a plurality of first sub-bands.

In one embodiment, for K second pre-coding matrixes obtained in K arrangement patterns of column vectors corresponding to a first pre-coding matrix, column vectors, corresponding to the same data stream, in the different second pre-coding matrixes includes all the column vectors in the first pre-coding matrix.

In one embodiment, the physical resource is a Resource Element (RE), a sub-carrier, a Physical Resource Block (PRB), or a PRB set; or the physical resource is an RE, a sub-carrier, a PRB, or a PRB set for transmitting a data symbol.

In one embodiment, the first pre-coding matrix in the first sub-band is agreed on between the terminal and a base station; or the terminal determines the first pre-coding matrix in the first sub-band as follows:

the terminal determines an RI according to downlink channel information, and selects a first pre-coding matrix from a set of first pre-coding matrixes corresponding to the RI.

In one embodiment, the CSI further includes an RI determined according to downlink channel information, and/or a Pre-coding Matrix Indicator (PMI) of the determined first pre-coding matrix.

An embodiment of the invention provides a terminal including:

a determining module configured to determine a first pre-coding matrix in a first sub-band;

an extending module configured to determine a second pre-coding matrix corresponding to a physical resource in the first sub-band according to the first pre-coding matrix, and an arrangement pattern of column vectors corresponding to the first pre-coding matrix:

a measuring module configured to determine a Channel Quality Indicator (CQI) in a second sub-band according to the second pre-coding matrix; and a feedback module configured to feed back CSI including the CQI.

In one embodiment, the measuring module is configured:

to determine a second pre-coding matrix corresponding to a physical resource in the second sub-band according to the second pre-coding matrix corresponding to the physical resource in the first sub-band, wherein a physical resource corresponds to a second pre-coding matrix; and to determine a CQI in the second sub-band according to the second pre-coding matrix corresponding to the physical resource in the second sub-band.

In one embodiment, the extending module is configured: to determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

In one embodiment, an i-th physical resource in the first sub-band corresponds to a k-th arrangement pattern of column vectors corresponding to the first pre-coding matrix, wherein:

k=i mod K, wherein i=0, 1, 2 ... N, k=0, 1, 2, 3, ..., K−1, K is the number of arrangement patterns of column vectors corresponding to the first pre-coding matrix, and N is the number of physical resources in the first sub-band; or k=ceil(i/v) mod K, wherein ceil(i/v) represents the minimum integer no less than i/v, v=RI, or v is the number of antenna ports, i=0, 1, 2 ... N, k=0, 1, 2, 3, ..., K−1, K is the number of arrangement patterns of column vectors corresponding to the first pre-coding matrix, and N is the number of physical resources in the first sub-band.

In one embodiment, the first sub-band includes one or more PRBs; and the second sub-band is the same as the first sub-band, or the second sub-band includes a plurality of first sub-bands.

In one embodiment, for K second pre-coding matrixes obtained in K arrangement patterns of column vectors corresponding to a first pre-coding matrix, column vectors, corresponding to the same data stream, in the different second pre-coding matrixes includes all the column vectors in the first pre-coding matrix.

In one embodiment, the first pre-coding matrix in the first sub-band is agreed on between the terminal and a base station; or the determining module is configured to determine an RI according to downlink channel information, and to select a first pre-coding matrix from a set of first pre-coding matrixes corresponding to the RI.

An embodiment of the invention provides another terminal including a processor, a memory, a transceiver, and a bus interface, wherein:

the processor is configured to read and execute program in the memory:

to determine a first pre-coding matrix in a first sub-band;

to determine a second pre-coding matrix corresponding to a physical resource in the first sub-band according to the first pre-coding matrix, and an arrangement pattern of column vectors corresponding to the first pre-coding matrix;

to determine a Channel Quality Indicator (CQI) in a second sub-band according to the second pre-coding matrix; and to feed back CSI including the CQI.

In the embodiment above of the invention, after the terminal determines the first pre-coding matrix in the first sub-band, it obtains the second pre-coding matrix corresponding to the physical resource in the first sub-band according to the first pre-coding matrix, and the arrangement pattern of column vectors corresponding thereto, and then determines the CSI in the second sub-band according to the second pre-coding matrix. In the embodiment above, the first pre-coding matrix is extended to the second pre-coding matrixes corresponding to the different physical resources, in the arrangement patterns of column vectors, and CSI is measured based upon the second pre-coding matrixes corresponding to the different physical resources, so the extent of matching between the CSI and a channel state can be improved over the related art in which CSI is measured based upon only one pre-coding matrix.

An embodiment of the invention provides a pre-coding method including:

receiving, by a base station, Channel State Information (CSI) fed back by a terminal, wherein the CSI includes a Channel Quality Indicator (CQI) in a second sub-band;

determining, by the base station, a modulation and coding scheme for downlink transmission according to the CQI;

determining, by the base station, a first pre-coding matrix in a first sub-band;

determining, by the base station, a second pre-coding matrix corresponding to a physical resource in the first sub-band according to the first pre-coding matrix in the first sub-band, and an arrangement pattern of column vectors corresponding to the first pre-coding matrix; and pre-coding, by the base station, data to be transmitted over the physical resource in the first sub-band, using the second pre-coding matrix corresponding to the physical resource according to the second pre-coding matrix.

In one embodiment, determining, by the base station, the second pre-coding matrix corresponding to the physical resource in the first sub-band according to the first pre-coding matrix in the first sub-band, and the arrangement pattern of column vectors corresponding to the first pre-coding matrix includes:

determining, by the base station, the second pre-coding matrix corresponding to the physical resource in the first sub-band according to the first pre-coding matrix in the first sub-band, and the correspondence relationship between an arrangement pattern of column vectors corresponding to the first pre-coding matrix, and a physical resource in the first sub-band.

In one embodiment, the correspondence relationship between an arrangement pattern of column vectors corresponding to the first pre-coding matrix, and a physical resource in the first sub-band is that:

an i-th physical resource in the first sub-band corresponds to a k-th arrangement pattern of column vectors corresponding to the first pre-coding matrix, wherein:

k=i mod K, wherein i=0, 1, 2 ... N, k=0, 1, 2, 3, ..., K−1, K is the number of arrangement patterns of column vectors corresponding to the first pre-coding matrix, and N is the number of physical resources in the first sub-band; or k=ceil(i/v) mod K, wherein ceil(i/v) represents the minimum integer no less than i/v, v=RI, or v is the number of antenna ports, i=0, 1, 2 ... N, k=0, 1, 2, 3, ..., K−1, K is the number of arrangement patterns of column vectors corresponding to the first pre-coding matrix, and N is the number of physical resources in the first sub-band.

In one embodiment, for K second pre-coding matrixes obtained in K arrangement patterns of column vectors corresponding to a first pre-coding matrix, column vectors, corresponding to the same data stream, in the different second pre-coding matrixes includes all the column vectors in the first pre-coding matrix.

In one embodiment, determining, by the base station, the first pre-coding matrix in the first sub-band includes:

determining, by the base station, the first pre-coding matrix in the first sub-band according to a Pre-coding Matrix Indicator (PMI) in the first sub-band, in the received CSI fed back by the terminal.

In one embodiment, the physical resource is a Resource Element (RE), a sub-carrier, a Physical Resource Block (PRB), or a PRB set; or the physical resource is an RE, a sub-carrier, a PRB, or a PRB set for transmitting a data symbol.

In one embodiment, the first sub-band includes one or more PRBs; and the second sub-band is the same as the first sub-band; or the second sub-band includes a plurality of first sub-bands.

An embodiment of the invention provides a base station including:

a receiving module configured to receive Channel State Information (CSI) fed back by a terminal, wherein the CSI includes a Channel Quality Indicator (CQI) in a second sub-band;

a first determining module configured to determine a modulation and coding scheme for downlink transmission according to the CQI;

a second determining module configured to determine a first pre-coding matrix in a first sub-band;

an extending module configured to determine a second pre-coding matrix corresponding to a physical resource in the first sub-band according to the first pre-coding matrix in the first sub-band, and an arrangement pattern of column vectors corresponding to the first pre-coding matrix; and a pre-coding module configured to pre-code data to be transmitted over the physical resource in the first sub-band, using the second pre-coding matrix corresponding to the physical resource according to the second pre-coding matrix.

In one embodiment, the second determining module is configured to determine the first pre-coding matrix in the first sub-band according to a Pre-coding Matrix Indicator (PMI) in the first sub-band, in the received CSI fed back by the terminal.

In one embodiment, the extending module is configured to determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

In one embodiment, an i-th physical resource in the first sub-band corresponds to a k-th arrangement pattern of column vectors corresponding to the first pre-coding matrix, wherein:

k=i mod K, wherein i=0, 1, 2 ... N, k=0, 1, 2, 3, ..., K−1, K is the number of arrangement patterns of column vectors corresponding to the first pre-coding matrix, and N is the number of physical resources in the first sub-band; or k=ceil(i/v) mod K, wherein ceil(i/v) represents the minimum integer no less than i/v, v=RI, or v is the number of antenna ports, i=0, 1, 2 ... N, k=0, 1, 2, 3, ..., K−1. K is the number of arrangement patterns of column vectors corresponding to the first pre-coding matrix, and N is the number of physical resources in the first sub-band.

In one embodiment, the first sub-band includes one or more PRBs; and the second sub-band is the same as the first sub-band; or the second sub-band includes a plurality of first sub-bands.

Another embodiment of the invention provides a base station including a processor, a memory, a transceiver, and a bus interface, wherein:

the processor is configured to read and execute program in the memory:

to receive Channel State Information (CSI) fed back by a terminal, wherein the CSI includes a Channel Quality Indicator (CQI) in a second sub-band:

to determine a modulation and coding scheme for downlink transmission according to the CQI;

to determine a first pre-coding matrix in a first sub-band;

to determine a second pre-coding matrix corresponding to a physical resource in the first sub-band according to the first pre-coding matrix in the first sub-band, and an arrangement pattern of column vectors corresponding to the first pre-coding matrix; and to pre-code data to be transmitted over the physical resource in the first sub-band, using the second pre-coding matrix corresponding to the physical resource according to the second pre-coding matrix.

In the embodiment above of the invention, further to the method for feeding back CSI by a terminal according to the embodiment above of the invention, the base station performing pre-coding determines the first pre-coding matrix in the first sub-band, obtains the second pre-coding matrix corresponding to the physical resource in the first sub-band based upon the first pre-coding matrix, and the arrangement pattern of column vectors corresponding to the first pre-coding matrix, and pre-codes data to be transmitted over the physical resource in the second pre-coding matrix, using the second pre-coding matrix corresponding to the physical resource according to the second pre-coding matrix. In the embodiment above, the first pre-coding matrix is extended to the second pre-coding matrixes corresponding to the different physical resources, in the arrangement patterns of column vectors, and data over the different physical resources are pre-coded based upon the second pre-coding matrixes, so the extent of matching between the precoded data and a channel state can be improved over the related art in which data are pre-coded based upon only one pre-coding matrix.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, etc.

It shall be further appreciated in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal, and the remaining components of the access network, where the remaining components of the access network can include an Internet Protocol (IP) network. The base station can further coordinate attribute management on the air interface, and for example, the base station can be a Base Communication module Station (BTS) in a GSM or CDMA system, or can be a base station (Node B) in a WCDMA system, or can be an evolved base station (Node B or eNB or e-Node B) in an LTE system, although the invention will not be limited thereto.

Figure 1:
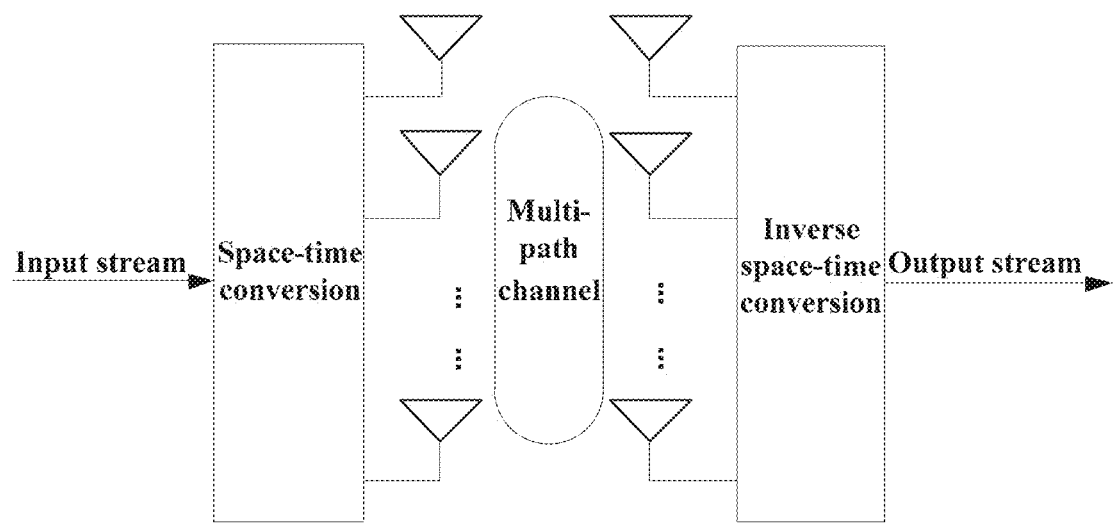
FIG. 1 is a schematic structural diagram of an MIMO system serving a single user in the related art.

The capacity of a system is extended in an LTE network using the MIMO technology. FIG. 1 illustrates a structural block diagram of an MIMO system serving a single user, for example, where both a transmitter (e.g., a base station) and a receiver (e.g., a terminal) are provided with multiple antennas. At the transmitter, an input serial code stream is converted into several parallel separate code sub-streams through a series of preprocessing (e.g., modulation, encoding, weighting, mapping, etc.), and the code sub-streams are transmitted out through different transmit antennas. At the receiver, multiple branches of signals are received using a group of antennas, the number of which is not less than the number of transmit antennas, and processed in the space domain and the time domain according to some estimated coding relationship between a channel transmit characteristic and a transmitted code sub-stream, so that the signals are separated into several transmitted code sub-streams, and the code sub-streams are further converted into serial data, which are output.

However, as the capacity is extended, interference also becomes higher accordingly due to the correlation between channels in a channel matrix, and in order to alleviate the complexity of implementing the terminal from being affected by the interference between the channels, and also lower an overhead of the system, and improve the capacity of the MIMO system as many as possible, pre-coding has been introduced in the related art.

Closed-loop pre-coding has been introduced to the LTE Rel-8 system so as to improve the spectrum efficiency. The same set of pre-coding matrixes, which is referred to as a codebook, is stored in the base station and the terminal as required for closed-loop pre-coding. After the terminal estimates channel information using a cell-common pilot, it selects a pre-coding matrix as per some criterion, and feeds the index of the pre-coding matrix in the codebook back to the base station over an uplink channel, where the index is denoted as a Pre-coding Matrix Indicator (PMI). The base station determines the pre-coding matrix used for the terminal according to the received PMI. The terminal further reports a corresponding Rank Indicator (RI) and Channel Quality Indicator (CQI) together with the PMI, so that the base station determines the number of codewords, and the number of transmission layers for downlink transmission, and modulating and coding schemes for the respective codewords.

Figure 2:
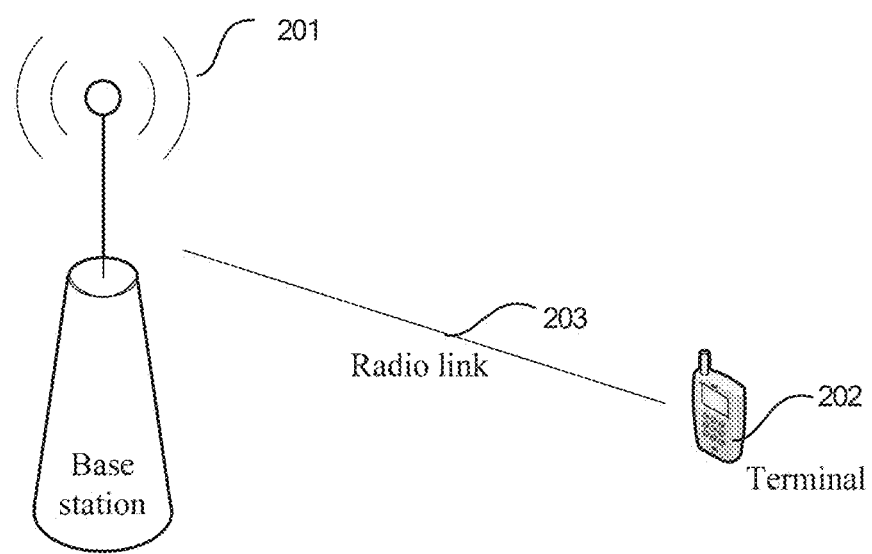
FIG. 2 is a schematic structural diagram of transmission through codebook based pre-coding in the related art.

FIG. 2 illustrates a structural diagram of a radio network using codebook based pre-coding in the related art, where the radio network includes a base station 201, a terminal 202, and a radio link 203. Both the terminal 202 and the base station 201 are provided with multiple antennas. The same set of pre-coding matrixes (codebook) is configured on the terminal 202 and the base station 201. After the terminal 202 measures a downlink channel and determines a pre-coding matrix, it feeds CSI back to the base station 201 over the radio link 203, where the CSI includes one or more of a CQI indicating the quality of a radio communication channel between the base station and the terminal, a PMI indicating a pre-coding matrix for shaping a signal to be transmitted, an RI indicating the number of useful transmission layers of a data channel by the terminal, and an estimated channel coefficient. The CSI is fed back so that the base station 201 can configure adaptively an appropriate transmission scheme to improve a coverage area, or to improve a transmission ratio of user data, or to predicate more precisely the channel quality for future transmission to the terminal 202.

Since there is a serious delay of feeding back CSI in the existing MIMO feedback mechanism, the CSI fed back by the terminal cannot match with the current channel, thus degrading the performance so significantly that the efficiency of transmission cannot be guaranteed, and this problem is particularly apparent in a scenario of mobility at a high speed. Accordingly it is highly desirable in the industry to improve the extent of matching between the CSI fed back by the terminal, and the real channel state.

In order to improve the extent of matching between CSI fed back by a terminal, and a channel state, the embodiments of the invention propose a solution to feeding back CSI. This solution can be applicable to a scenario of downlink MIMO transmission. In the embodiments of the invention, the terminal rearranges a pre-coding matrix into a second pre-coding matrix in a different arrangement pattern of column vectors, and measures CSI using the second pre-coding matrix as a pre-coding matrix over a different physical resource to obtain a corresponding RI, PMI, CQI, and other information, so that the CSI to be fed back can better match with a channel state, a Signal To Interference plus Noise Ratio (SINR) between respective data streams can be further balanced, and the performance in a scenario of mobility at a high speed can be guaranteed.

The embodiments of the invention will be described below in details with reference to the drawings.

Figure 3:
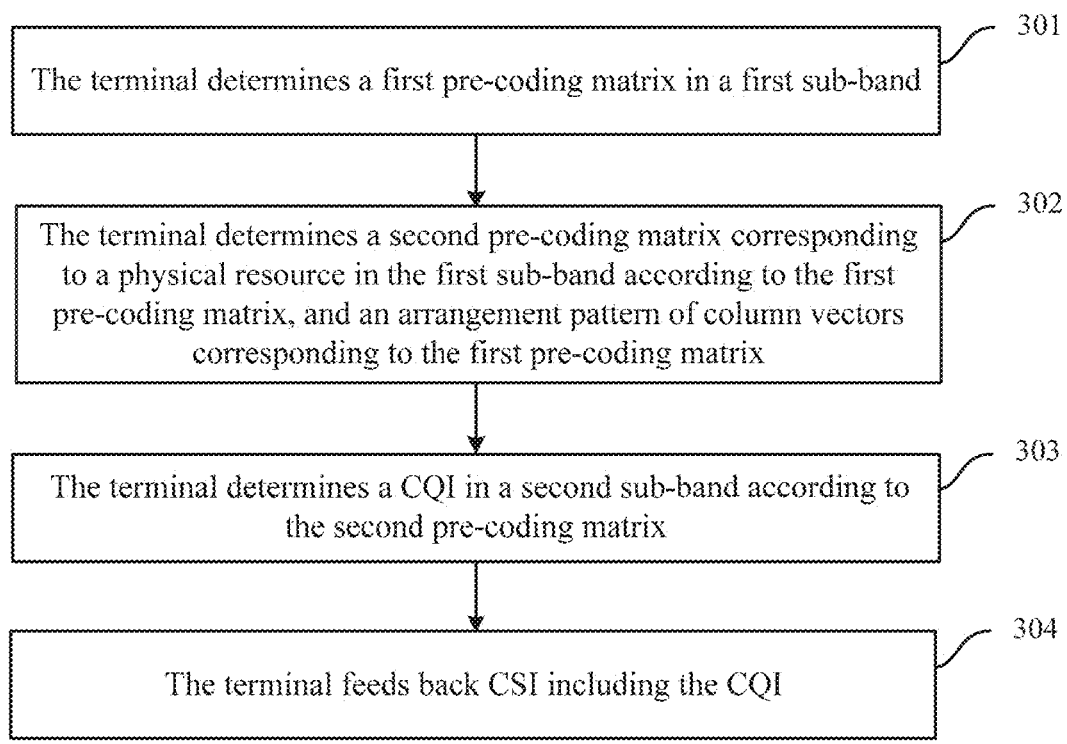
FIG. 3 is a schematic flow chart of feeding back CSI according to an embodiment of the invention.

FIG. 3 illustrates a schematic flow chart of feeding back CSI according to an embodiment of the invention, and the flow can be performed by a terminal.

The same codebook can be agreed on in advance between the terminal and a base station, and in this codebook, different numbers of data streams (ranks), i.e., different values of an RI, correspond to respective sets of pre-coding matrixes. A correspondence relationship between a rank or an RI and a set of pre-coding matrixes can be agreed on in advance between the terminal and the base station, e.g., stored in advance at the terminal side and the base station side, where the rank corresponding to the RI is equal to the number of columns in a pre-coding matrix in the set of pre-coding matrixes.

As illustrated in FIG. 3, the flow includes the following steps.

In the step 301, the terminal determines a first pre-coding matrix in a first sub-band.

The first sub-band can include one or more Physical Resource Blocks (PRBs), and the width of the first sub-band can also be the width of a system wideband.

For a first pre-coding matrix in a codebook, the terminal and the base station can agree on in advance a first sub-band corresponding to the pre-coding matrix, so that the terminal measuring CSI can calculate a CQI using a second pre-coding matrix of the pre-coding matrix in the sub-band.

In some embodiments, the first pre-coding matrix in the first sub-band is agreed on in advance between the terminal and the base station, so that the terminal can determine the first pre-coding matrix in the first sub-band according to the agreement. In some other embodiments, the terminal can determine the first pre-coding matrix in the first sub-band as follows: it determines an RI according to downlink channel information, and selects a first pre-coding matrix from a set of first pre-coding matrixes corresponding to the RI, where the value of the RI represents the number of data streams. The terminal can select the first pre-coding matrix from the set of first pre-coding matrixes corresponding to the RI as per some criterion, e.g., a maximized amount of exchanged information, a maximized output signal to interference plus noise, etc. For example, the terminal can select the optimum first pre-coding matrix by comparing channel capacities, transport block sizes. SINRs. and other physical quantities calculated using different first pre-coding matrixes. The embodiment of the invention will not be limited to any particular criterion.

In the step 302, the terminal determines a second pre-coding matrix corresponding to a physical resource in the first sub-band according to the first pre-coding matrix determined in the step 301, and an arrangement pattern of column vectors corresponding to the first pre-coding matrix.

Here the arrangement pattern of column vectors can be understood as an arrangement pattern of column vectors in a pre-coding matrix for a data transmission layer, or a mapping pattern of a codeword to a data transmission layer, or an arrangement order of respective data transmission layers.

In the embodiment of the invention, different physical resources can be different time resources, or can be different frequency resources, or can be different combinations of time and frequency resources. Particularly, a physical resource in the first sub-band and a second sub-band can be a Resource Element (RE), a sub-carrier, a PRB, or a set of PRBs, or can be an RE, a sub-carrier, a RPB, or a set of PRBs for transmitting a data symbol, that is, is not a physical resource for transmitting a pilot signal, or another signal than a data symbol. For example, different PRBs in the first sub-band correspond to a second pre-coding matrix obtained in a different arrangement pattern of column vectors, or different REs for transmitting data in the first sub-band correspond to a second pre-coding matrix obtained in a different arrangement pattern of column vectors.

A first pre-coding matrix can correspond to one or more arrangement patterns of column vectors, and a corresponding second pre-coding matrix can be obtained in an arrangement pattern of column vectors corresponding to the first pre-coding matrix. As can be apparent, a first pre-coding matrix can be extended as described above to one or more corresponding second pre-coding matrixes.

The arrangement pattern of column vectors here can be represented in the form of a column swap matrix. Correspondingly the second pre-coding matrix can be obtained by rearranging the column vectors in the arrangement pattern of column vectors.

For example, if there are two column vectors in a first pre-coding matrix, and the column vectors are initially arranged in the order of $\{1, 2\}$, where the numerals in "$\{\ \}$" represent the indexes of the column vectors. There may be two arrangement patterns of column vectors corresponding to the first pre-coding matrix, which are represented respectively as $\{1, 2\}$ and $\{2, 1\}$, and the terminal can obtain two different second pre-coding matrixes in these two arrangement patterns of column vectors.

In another example, if there are four column vectors in a first pre-coding matrix $W_0$, and the pre-coding matrix $W_0$ is represented as $W_0=[V_1\ V_2\ V_3\ V_4]$, where the column vectors are initially represented in the order of $\{1, 2, 3, 4\}$, then there may be four arrangement patterns of column vectors corresponding to the pre-coding matrix $W_0$, which are represented respectively as $\{1, 2, 3, 4\}$, $\{2, 3, 4, 1\}$, $\{3, 4, 1, 2\}$, and $\{4, 1, 2, 3\}$, and the terminal can obtain the following four different second pre-coding matrixes in these four arrangement patterns of column vectors:

The second pre-coding matrix corresponding to $\{1,2,3,4\}$ is $W_1=[V_1\ V_2\ V_3\ V_4]$;

The second pre-coding matrix corresponding to $\{2,3,4,1\}$ is $W_2=[V_2\ V_3\ V_4\ V_1]$;

The second pre-coding matrix corresponding to $\{3,4,1,2\}$ is $W_3=[V_3\ V_4\ V_1\ V_2]$; and The second pre-coding matrix corresponding to {4,1,2,3} is $W_4=[V_4\ V_1\ V_2\ V_3]$.

Here $V_1$ represents the first column vector in the pre-coding matrix $W_0$, and the index thereof is 1; $V_2$ represents the second column vector in the pre-coding matrix $W_0$, and the index thereof is 2; $V_3$ represents the third column vector in the pre-coding matrix $W_0$, and the index thereof is 3; and $V_4$ represents the fourth column vector in the pre-coding matrix $W_0$, and the index thereof is 4.

For the pre-coding matrix $W_0$, there may be also the following four arrangement patterns of column vectors: {1, 2, 3, 4}, {2, 1, 4, 3}, {3, 4, 1, 2}, and {4, 3, 2, 1}, in addition to the four arrangement patterns of column vectors given above. The arrangement patterns of column vectors given above are only an example, and the arrangement patterns of column vectors corresponding to the pre-coding matrix including four column vectors will not be limited to the example above.

In the case that the number of arrangement patterns of column vectors corresponding to a first pre-coding matrix W, a second pre-coding matrix obtained in the arrangement pattern of column vectors is the same as the first pre-coding matrix W.

In another embodiment, the second pre-coding matrix can alternatively be obtained by multiplying the first pre-coding matrix with the column swap matrix corresponding to the arrangement pattern of column vectors to thereby obtain the second arrangement pattern of column vectors corresponding to the first pre-coding matrix.

Two examples of the column swap matrix will be given below.

With the rank of 2, the swap matrixes include:

$$W = \begin{bmatrix} 1 & 0 \\ 0 & 1 \end{bmatrix} W = \begin{bmatrix} 0 & 1 \\ 1 & 0 \end{bmatrix}.$$

The first pre-coding matrix including two column vectors is multiplied respectively with the two swap matrixes above to obtain two second pre-coding matrixes corresponding to the first pre-coding matrix.

With the rank of 4, the swap matrixes include:

$$W = \begin{bmatrix} 1 & 0 & 0 & 0 \\ 0 & 1 & 0 & 0 \\ 0 & 0 & 1 & 0 \\ 0 & 0 & 0 & 1 \end{bmatrix} W = \begin{bmatrix} 0 & 0 & 0 & 1 \\ 1 & 0 & 0 & 0 \\ 0 & 1 & 0 & 0 \\ 0 & 0 & 1 & 0 \end{bmatrix}$$

$$W = \begin{bmatrix} 0 & 0 & 1 & 0 \\ 0 & 0 & 0 & 1 \\ 1 & 0 & 0 & 0 \\ 0 & 1 & 0 & 0 \end{bmatrix} W = \begin{bmatrix} 0 & 1 & 0 & 0 \\ 0 & 0 & 1 & 0 \\ 0 & 0 & 0 & 1 \\ 1 & 0 & 0 & 0 \end{bmatrix}.$$

The first pre-coding matrix including two column vectors is multiplied respectively with the four swap matrixes above to obtain four second pre-coding matrixes corresponding to the first pre-coding matrix.

In the LTE system, downlink transmission of at most two codewords is supported at present, and each codeword can have a respective modulation and coding scheme, and a separate Hybrid Automatic Repeat Request (HARQ) process. If the number of downlink transmission layers is greater than 2, then a codebook may be mapped to a plurality of data streams (a data stream is at a layer). A mapping relationship between a codebook and a transmission layer is well predefined; and if the number L of layers is an even number, then the number of transmission layers to which each codeword is mapped will be L/2, and if the number L of transmission layers is an odd number, then the number of transmission layers to which two codewords are mapped will be (L−1)/2 and (L+1)/2 respectively. For example, when the number of downlink transmission layers is 4, each codeword is mapped to two data streams, and the same modulation and coding scheme is applied to these two data streams. During downlink pre-coding, different pre-coding vectors are applied to the respective data streams, and the k-th data stream is pre-coded using the k-th column vector in the pre-coding matrix, so that detected SINRs of the respective data streams going through a channel are also different from each other. The terminal estimating a CQI generally processes SINRs of all the data streams mapped to the same codeword into an equivalent SINR of the codeword to thereby calculate the CQI. For example, a common practice is to average all the SINRs corresponding to the data streams into the equivalent SINR of the codeword.

In one embodiment, in order better equalize the SINRs between the respective data streams, in an embodiment of the invention, a corresponding arrangement pattern of column vectors is set for a set of pre-coding matrixes in such a way that for K second pre-coding matrixes obtained in K arrangement patterns of column vectors corresponding to a first pre-coding matrix, column vectors, corresponding to the same data stream, in a different second pre-coding matrix include all the column vectors of the pre-coding matrix. Stated otherwise, a second pre-coding matrix corresponding to a first pre-coding matrix shall be such that a pre-coding vector for each data stream traverses respective column vectors of the pre-coding matrix. As can be apparent, each data stream traverses the different column vectors in the pre-coding matrix, channel gains of the respective data streams are substantially equivalent, and the difference between their SINRs is insignificant, so that SINRs of different data streams corresponding to a codeword can be avoided from being not equalized.

By way of an example, the first pre-coding matrix $W_0$ including four column vectors corresponds to four arrangement patterns of column vectors, which are {1, 2, 3, 4}, {2, 3, 4, 1}, {3, 4, 1, 2}, and {4, 1, 2, 3} respectively, and the corresponding second pre-coding matrixes are $W_1$, $W_2$, $W_3$, and $W_4$ respectively:

$W_1 = [\ V_1\ \ V_2\ \ V_3\ \ V_4\ ]$;

$W_2 = [\ V_2\ \ V_3\ \ V_4\ \ V_5\ ]$;

$W_3 = [\ V_3\ \ V_4\ \ V_1\ \ V_2\ ]$; and $W_4 = [\ V_4\ \ V_1\ \ V_2\ \ V_3\ ]$.

A correspondence relationship between a data stream and a column vector is that: the first data stream corresponds to the first column vector, the second data stream corresponds to the second column vector, the third data stream corresponds to the third column vector, and the fourth data stream corresponds to the fourth column vector. In this way, for the first data stream, the column vector corresponding thereto in the second pre-coding matrix $W_1$ is $V_1$, the column vector corresponding thereto in the second pre-coding matrix $W_2$ is $V_2$, the column vector corresponding thereto in the second pre-coding matrix $W_3$ is $V_3$, and the column vector corresponding thereto in the second pre-coding matrix $W_4$ is $V_4$. As can be apparent, the column vectors corresponding to the first data stream in the four second pre-coding matrixes above are different, and the four column vectors corresponding thereto in the different second pre-coding matrixes include the four column vectors in the pre-coding matrix $W_0$.

In some embodiments, the terminal can determine the first pre-coding matrix determined in the step 301 the arrangement pattern of column vectors corresponding to the first pre-coding matrix in the sub-band according to a correspondence relationship between a first pre-coding matrix, and an arrangement pattern of column vectors, where the correspondence relationship between a first pre-coding matrix, and an arrangement pattern of column vectors can be agreed on in advance between the terminal and the base station, or can be configured by the base station for the terminal, and for example, the base station can signal the correspondence relationship to the terminal via downlink signaling.

In some other embodiments, for the first pre-coding matrix determined in the step 301, the terminal can select one of a plurality of combinations of arrangement patterns of column vectors corresponding to the first pre-coding matrix in the first sub-band according to downlink channel information to thereby obtain the arrangement pattern of column vectors corresponding to the first pre-coding matrix, where a combination of arrangement patterns of column vectors includes one or more arrangement patterns of column vectors. A correspondence relationship between a first pre-coding matrix and a combination of arrangement patterns of column vectors can be agreed on in advance between the terminal and the base station, or can be configured by the base station for the terminal, and for example, the base station can signal the correspondence relationship to the terminal via downlink signaling.

By way of an example, for a first pre-coding matrix, the terminal and the base station can agree on in advance a plurality of different combinations of arrangement patterns of column vectors, and the terminal can select the optimum combination of arrangement patterns of column vectors. For example, for a first pre-coding matrix, including four column vectors, determined in the step 301, the terminal and the base station can agree on in advance the following two combinations of arrangement patterns of column vectors:

The combination 1 includes {1, 2, 3, 4}, {2, 3, 4, 1}, {3, 4, 1, 2}, and {4, 1, 2, 3}, and The combination 2 includes {1, 2, 3, 4}, {2, 1, 4, 3}, {3, 4, 1, 2}, and {4, 3, 2, 1}.

The terminal can select one of the combination 1 and the combination 2 above according to channel state information, where the combination includes four arrangement patterns of column vectors, and the terminal can obtain four second pre-coding matrixes in these four arrangement patterns of column vectors. Furthermore the terminal can further report the index of the selected combination to the base station, and the index of the combination can be reported together with a PMI of the pre-coding matrix.

A correspondence relationship between a pre-coding matrix and an arrangement pattern of column vectors can be represented in a number of forms. In one embodiment, the correspondence relationship can be represented as a correspondence relationship between the number of columns in a first pre-coding matrix, and an arrangement pattern of column vectors, and for example, a correspondence relationship between the number of column vectors (i.e., the number of columns), and an arrangement pattern of column vectors can be preset, so that the terminal can determine the arrangement pattern of column vectors corresponding to the first pre-coding matrix according to the number of columns in the first pre-coding matrix. In the example above, for example, if the number of vector columns in the first pre-coding matrix is equal to 4, then arrangement patterns of column vectors including {1, 2, 3, 4}, {2, 1, 4, 3}, {3, 4, 1, 2}, and {4, 3, 2, 1} may be determined according to the number of vector columns. In some other embodiments, the correspondence relationship can alternatively be represented as a correspondence relationship between an RI corresponding to a first pre-coding matrix, and an arrangement pattern of column vectors, and for example, a correspondence relationship between an RI and an arrangement pattern of column vectors can be preset, so that the terminal can determine the arrangement pattern of column vectors corresponding to the first pre-coding matrix according to the RI corresponding to the pre-coding matrix.

In one embodiment, arrangement patterns of column vectors corresponding to respective physical resources in respective physical resources in the first sub-band can be preset, so that the terminal can determine second pre-coding matrixes corresponding to the respective physical resources in the first sub-band, for the first pre-coding matrix in the first sub-band determined in the step 301, and the arrangement pattern of column vectors corresponding to the first pre-coding matrix, according to a correspondence relationship between a physical resource and an arrangement pattern of column vectors. Of course, alternatively arrangement patterns of column vectors corresponding to respective physical resources in the second sub-band can be preset, where the correspondence relationship between a physical resource and an arrangement pattern of column vectors can be agreed on in advance between the terminal and the base station, or can be signaled by the base station to the terminal.

As an example of the correspondence relationship between a physical resource and an arrangement pattern of column vectors, every K (K is an integer greater than or equal to 1) consecutive physical resources in the first sub-band correspond to K different arrangement patterns of column vectors, where K is the number of arrangement patterns of column vectors corresponding to the first pre-coding matrix in the first sub-band.

For example, the i-th physical resource in the first sub-band corresponds to the k-th arrangement pattern of column vectors, so that the terminal can apply the second pre-coding matrix corresponding to the k-th arrangement pattern of column vectors over the i-th physical resource, where k=i mod K, i=0, 1, 2 . . . N, k=0, 1, 2, 3, . . . , K−1, K is the number of arrangement patterns of column vectors corresponding to the first pre-coding matrix, and N is the number of physical resources in the first sub-band. Stated otherwise, the second pre-coding matrixes obtained in the different arrangement patterns of column vectors in a unit of K physical resources are applied cyclically. Alternatively k=ceil(i/v) mod K, where ceil(a) represents the minimum integer no less than a, v is a positive integer, and v=RI, or v is the number of antenna ports, or another value.

Furthermore, if the number of physical resources in the first sub-band is greater than the number of arrangement patterns of column vectors, then the second pre-coding matrixes obtained in the different arrangement patterns of column vectors may be applied cyclically over the physical resources in the first sub-band.

In the step 303, the terminal determines a CQI in a second sub-band according to the second pre-coding matrix determined in the step 302.

Here, the bandwidth of the second sub-band is greater than or equal to the bandwidth of the first sub-band.

The second sub-band may include one or more PRBs, or the width of the second sub-band may be the width of the system wideband. The second sub-band may be the same as the first sub-band, or the second sub-band may include a plurality of first sub-bands, or be consisted of a plurality of first sub-bands. For example, the width of the second sub-band is the system wideband, and the system wideband includes a sub-band A, a sub-band B, and a sub-band C, where the sub-band A, the sub-band B, and the sub-band C are three first sub-bands respectively, and these three first sub-bands are different sub-bands from each other, that is, they do not overlap in the frequency domain.

In one embodiment, in the step 303, the terminal can determine a second pre-coding matrix corresponding to a physical resource in the second sub-band according to the second pre-coding matrix corresponding to a physical resource in the first sub-band, and determine a CQI in the second sub-band according to the second pre-coding matrix corresponding to the physical resource in the second sub-band, where a physical resource corresponds to a second pre-coding matrix. In a particular implementation, the terminal can determine the CQI in the second sub-band according to the second pre-coding matrix corresponding to the physical resource in the second sub-band in the following implementation: the terminal determines the CQI in the second sub-band on the assumption that data to be transmitted over the physical resource in the second sub-band are pre-coded using the second pre-coding matrix corresponding to the physical resource.

Particularly, there may be two instances of the implementation above.

In a first instance, the second sub-band includes a plurality of first sub-bands.

In this instance, the terminal can firstly determine a second pre-coding matrix corresponding to each physical resource in the respective first sub-bands in the second sub-band to thereby determine a second pre-coding matrix corresponding to each physical resource in the second sub-band, and thereafter determine the CQI in the second sub-band according to the second pre-coding matrix corresponding to each physical resource in the second sub-band.

In a second instance, the first sub-band is the same as the second sub-band.

In this instance, the terminal can determine the CQI in the second sub-band directly according to the second pre-coding matrix corresponding to each physical resource in the first sub-band (i.e., the second sub-band).

In a particular implementation, the terminal can determine the CQI in the second sub-band as follows: it can firstly calculate an SINR corresponding to each physical resource in the second sub-band according to the second pre-coding matrix corresponding to each physical resource in the second sub-band, and downlink channel information corresponding to the second sub-band to thereby determine an equivalent SINR in the second sub-band, and further determine the CQI in the second sub-band according to a correspondence relationship between an equivalent SINR and a CQI indicator.

In the step 304, the terminal feeds back CSI including the CQI obtained in the step 303.

Here the CSI fed back by the terminal can further include an RI determined according to downlink channel information, and/or a PMI of the first pre-coding matrix determined in the step 301. In a particular implementation, the base station can configure the terminal to feed back one or more of the information above in the CSI, and the terminal can feed the information, to be fed back, back in the CSI as configured by the base station. For example, the base station can configure the terminal to report only the CQI, or only the RI and the CQI, or the RI, the PMI, and the CQI.

As can be apparent from the description above, in the embodiment above of the invention, after the terminal determines the first pre-coding matrix in the first sub-band, it obtains the second pre-coding matrix corresponding to the physical resource in the first sub-band according to the first pre-coding matrix, and the arrangement pattern of column vectors corresponding thereto, and then determines the CSI in the second sub-band according to the second pre-coding matrix. In the embodiment above, the first pre-coding matrix is extended to the second pre-coding matrixes corresponding to the different physical resources, in the arrangement patterns of column vectors, and CSI is measured based upon the second pre-coding matrixes corresponding to the different physical resources, so the extent of matching between the CSI and a channel state can be improved over the related art in which CSI is measured based upon only one pre-coding matrix.

Figure 4:
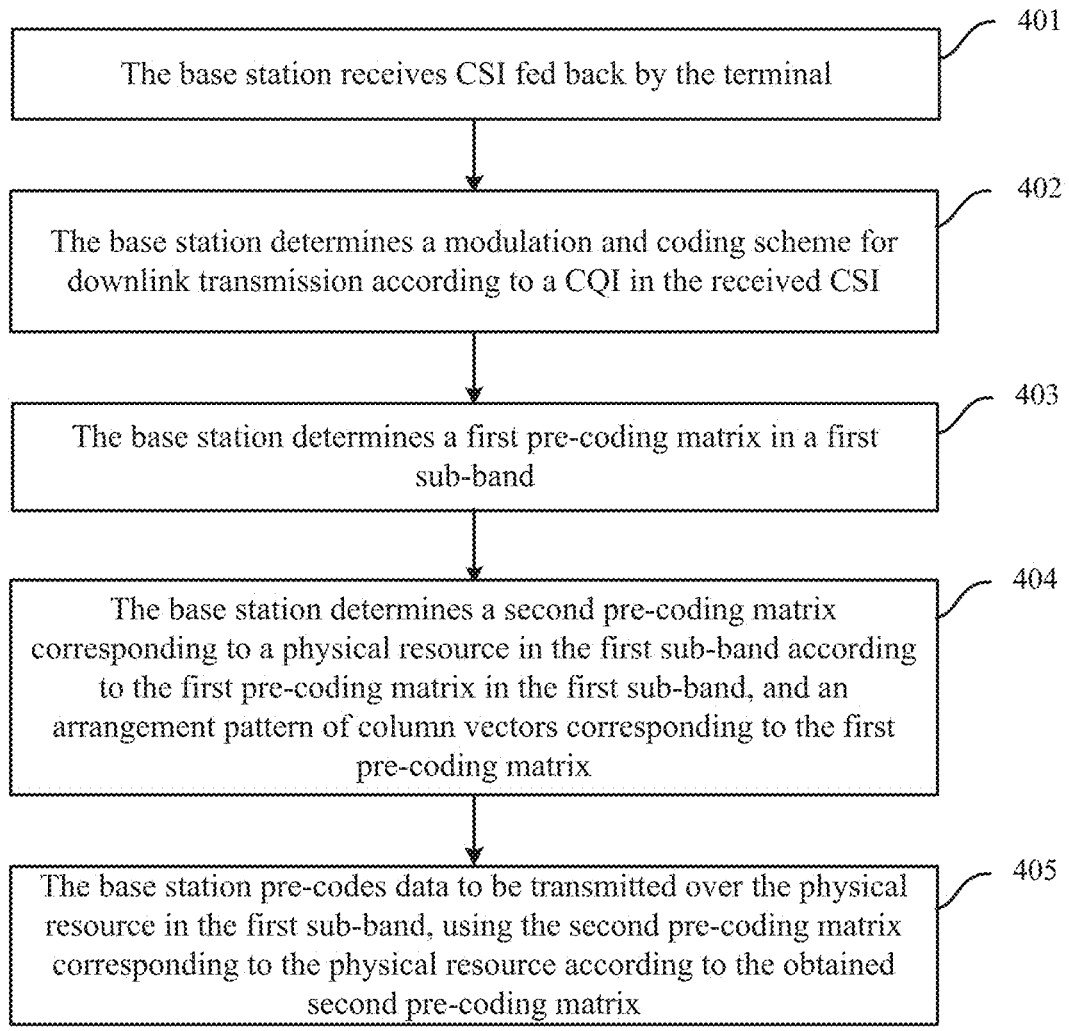
FIG. 4 is a schematic flow chart of pre-coding according to an embodiment of the invention.

Referring to FIG. 4 which is a schematic flow chart of pre-coding according to an embodiment of the invention, the flow can be performed by a base station.

The same codebook can be agreed on in advance between a terminal and the base station, and in this codebook, different numbers of data streams (ranks), i.e., different values of an RI, correspond to respective sets of pre-coding matrixes. A correspondence relationship between a rank or an RI and a set of pre-coding matrixes can be agreed on in advance between the terminal and the base station, e.g., stored in advance at the terminal side and the base station side, where the rank corresponding to the RI is equal to the number of columns in a pre-coding matrix in the set of pre-coding matrixes.

As illustrated in FIG. 4, the flow can include the following steps.

In the step 401, the base station receives CSI fed back by the terminal.

Here the CSI reported by the terminal includes a CQI in a second sub-band. Particularly the terminal can measure and report the CSI according to a second pre-coding matrix as described in the embodiment above, so a repeated description thereof will be omitted here. Of course, the terminal can alternatively measure and feed back the CQI otherwise.

Here the first sub-band and the second sub-band can be defined, and an arrangement pattern of column vectors can be defined and arranged, as described in the embodiment above, so a repeated description thereof will be omitted here.

In the step 402, the base station determines a modulation and coding scheme for downlink transmission according to a CQI in the CSI received in the step 401.

Particularly, the base station can determine the Modulation and Coding Scheme (MCS) for downlink transmission according to the CQI in the range of a system wideband.

In the step 403, the base station determines a first pre-coding matrix in a first sub-band.

By way of an example, the first pre-coding matrix in the first sub-band is agreed on between the base station and the terminal. In another example, the base station can determine the first pre-coding matrix in the first sub-band as follows: it selects a corresponding first pre-coding matrix in a set of pre-coding matrixes according to a PMI in the CSI received in the step 401.

In the step 404, the base station determines a second pre-coding matrix corresponding to a physical resource in the first sub-band according to the first pre-coding matrix in the first sub-band, where the second pre-coding matrix is obtained based upon the first pre-coding matrix, and an arrangement pattern of column vectors corresponding to the first pre-coding matrix, particularly in the same way as the terminal side obtains the second pre-coding matrix according to the first pre-coding matrix, and an arrangement pattern of column vectors corresponding to the first pre-coding matrix.

Particularly, the base station can determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

Here, the base station can determine the arrangement pattern of column vectors corresponding to the first pre-coding matrix in the first sub-band in the following two implementations:

The base station determines the arrangement pattern of column vectors corresponding to the first pre-coding matrix in the first sub-band according to a correspondence relationship between a first pre-coding matrix and an arrangement pattern of column vectors, where the correspondence relationship between a first pre-coding matrix and an arrangement pattern of column vectors is agreed on in advance between the base station and the terminal, or the base station signals the correspondence relationship between a first pre-coding matrix and an arrangement pattern of column vectors to the terminal; and The base station selects one of a plurality of combinations of arrangement patterns of column vectors corresponding to the first pre-coding matrix in the first sub-band according to the combinations of arrangement patterns of column vectors reported by the terminal, where a combination of arrangement patterns of column vectors includes one or more arrangement patterns of column vectors; and a correspondence relationship between a first pre-coding matrix and a combination of arrangement patterns of column vectors is agreed on in advance between the terminal and the base station, or the base station signals the correspondence relationship between a first pre-coding matrix and a combination of arrangement patterns of column vectors to the terminal.

A particular implementation of the step is substantially the same as the implementation in which the terminal side extends the first pre-coding matrix in the first sub-band to the second pre-coding matrix in the first sub-band in the arrangement pattern of column vectors corresponding to the first pre-coding matrix in the first sub-band in the embodiment above. Furthermore the correspondence relationship between a physical resource and an arrangement pattern of column vectors, and the physical resource, in the first sub-band can also be substantially the same as in the flow at the terminal side according to the embodiment above, so a repeated description thereof will be omitted here.

In the step 405, the base station pre-codes data to be transmitted over the physical resource in the first sub-band, using the second pre-coding matrix corresponding to the physical resource according to the second pre-coding matrix obtained in the step 404.

In this step, the base station can pre-code the data to be transmitted over the physical resource in the first sub-band, using the second pre-coding matrix corresponding to the physical resource according to a correspondence relationship between a physical resource in the first sub-band, and a second pre-coding matrix, where a physical resource corresponds to a second pre-coding matrix.

If there are a plurality of first sub-bands, then for each first sub-band, data to be transmitted over different physical resources in the first sub-band may be pre-coded using different second pre-coding matrixes.

Furthermore, if the CSI reported by the terminal includes an RI, then the base station can determine the number of downlink transmission streams based upon the RI.

It shall be noted that the steps in the flow as illustrated in FIG. 4 will not be limited to the order in the embodiment above, and for example, the step of determining the modulation and coding scheme for downlink transmission according to the CQI can alternatively be performed after the step of determining the first pre-coding matrix in the first sub-band, or the step of extending the first pre-coding matrix, or can be performed concurrently with the step of determining the first pre-coding matrix in the first sub-band, or the step of extending the first pre-coding matrix, although a repeated description thereof will be omitted here.

In the embodiment above of the invention, the base station performing pre-coding determines the first pre-coding matrix in the first sub-band, obtains the second pre-coding matrix corresponding to the physical resource in the first sub-band based upon the first pre-coding matrix, and the arrangement pattern of column vectors corresponding to the first pre-coding matrix, and pre-codes data to be transmitted over the physical resource in the second pre-coding matrix, using the second pre-coding matrix corresponding to the physical resource according to the second pre-coding matrix. In the embodiment above, the first pre-coding matrix is extended to the second pre-coding matrixes corresponding to the different physical resources, in the arrangement patterns of column vectors, and data over the different physical resources are pre-coded based upon the second pre-coding matrixes, so the extent of matching between the preceded data and a channel state can be improved over the related art in which data are pre-coded based upon only one pre-coding matrix.

In the related art, the terminal feeding back CSI feeds back the PMI of only one pre-coding matrix, and in the scenario of mobility at a high speed, the CSI (e.g., the PMI and the CQI) mismatches with an instantaneous channel, thus seriously degrading the performance. In the embodiments above of the invention, the first pre-coding matrix is extended in the arrangement patterns of column vectors, and data over the different physical resources are pre-coded using the different second pre-coding matrixes, so that the pre-coded data can better match with a real channel in the scenario of mobility at a high speed. Furthermore the arrangement patterns of column vectors are set so that each data stream traverses the respective pre-coding column vectors, and thus each data stream to be transmitted can be pre-coded using the different column vectors, thus improving the robustness of transmission, and achieving a more stable gain of pre-coding. Particularly in the scenario of mobility at a high speed, even if the channel is changing dramatically, then a stable gain of pre-coding will be guaranteed, thus improving the performance over the traditional MIMO transmission solution.

Based upon the same technical idea, an embodiment of the invention further provides a terminal.

Figure 5:
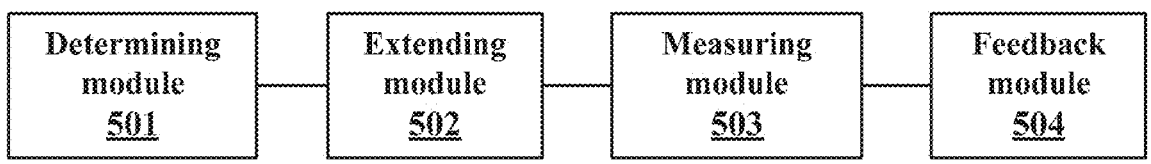
FIG. 5 is a schematic structural diagram of a terminal according to an embodiment of the invention.

Referring to FIG. 5 which is a schematic structural diagram of a terminal according to an embodiment of the invention, the terminal can perform the flow above of feeding back CSI at the terminal side. The terminal can include a determining module 501, an extending module 502, a measuring module 503, and a feedback module 504.

The determining module 501 is configured to determine a first pre-coding matrix in a first sub-band.

The extending module 502 is configured to determine a second pre-coding matrix corresponding to a physical resource in the first sub-band according to the first pre-coding matrix, and an arrangement pattern of column vectors corresponding to the first pre-coding matrix.

The measuring module 503 is configured to determine a Channel Quality Indicator (CQI) in a second sub-band according to the second pre-coding matrix.

The feedback module 504 is configured to feed back CSI including the CQI.

In one embodiment, the measuring module 503 can be configured:

to determine a second pre-coding matrix corresponding to a physical resource in the second sub-band according to the second pre-coding matrix corresponding to the physical resource in the first sub-band, where a physical resource corresponds to a second pre-coding matrix; and to determine a CQI in the second sub-band according to the second pre-coding matrix corresponding to the physical resource in the second sub-band.

In one embodiment, the extending module 502 can be configured: to determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

The i-th physical resource in the first sub-band corresponds to the k-th arrangement pattern of column vectors corresponding to the first pre-coding matrix, where:

k=i mod K, where i=0, 1, 2 ... N, k=0, 1, 2, 3, ..., K−1, K is the number of arrangement patterns of column vectors corresponding to the first pre-coding matrix, and N is the number of physical resources in the first sub-band; or k=ceil (i/v) mod K, where ceil (i/v) represents the minimum integer no less than i/v, v=RI, or v is the number of antenna ports, i=0, 1, 2 ... N, k=0, 1, 2, 3, ..., K−1, K is the number of arrangement patterns of column vectors corresponding to the first pre-coding matrix, and N is the number of physical resources in the first sub-band.

In one embodiment, the first sub-band includes one or more PRBs; and the second sub-band is the same as the first sub-band, or the second sub-band includes a plurality of first sub-bands.

In one embodiment, for K second pre-coding matrixes obtained in K arrangement patterns of column vectors corresponding to a first pre-coding matrix, column vectors, corresponding to the same data stream, in the different second pre-coding matrixes includes all the column vectors in the first pre-coding matrix.

In one embodiment, the first pre-coding matrix in the first sub-band is agreed on between the terminal and a base station.

In one embodiment, the determining module is configured to determine RI according to downlink channel information, and to select a first pre-coding matrix from a set of first pre-coding matrixes corresponding to the RI.

Based upon the same technical idea, an embodiment of the invention further provides a base station.

Figure 6:
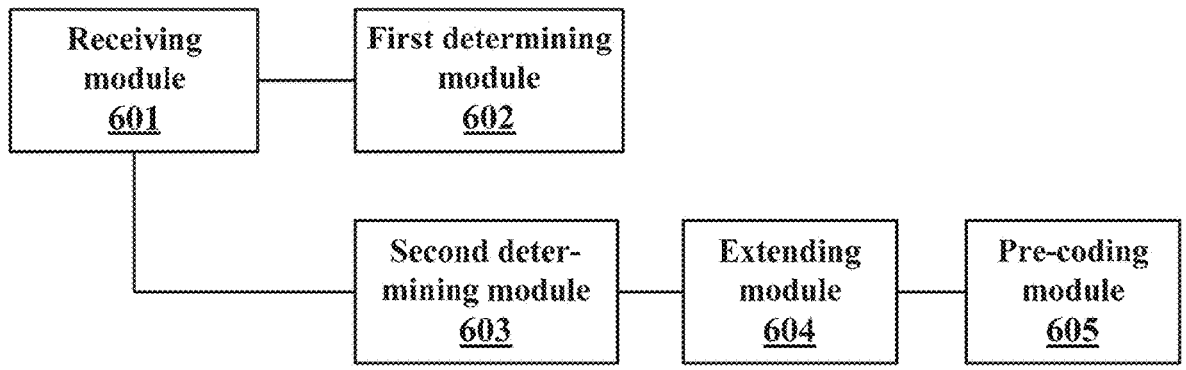
FIG. 6 is a schematic structural diagram of a base station according to an embodiment of the invention.

Referring to FIG. 6 which is a schematic structural diagram of a base station according to an embodiment of the invention, the base station can perform the flow above of pre-coding at the base station side. The base station can include a receiving module 601, a first determining module 602, a second determining module 603, an extending module 604, and a pre-coding module 605.

The receiving module 601 is configured to receive Channel State Information (CSI) fed back by a terminal, where the CSI includes a Channel Quality Indicator (CQI) in a second sub-band.

The first determining module 602 is configured to determine a modulation and coding scheme for downlink transmission according to the CQI.

The second determining module 603 is configured to determine a first pre-coding matrix in a first sub-band.

The extending module 604 is configured to determine a second pre-coding matrix corresponding to a physical resource in the first sub-band according to the first pre-coding matrix in the first sub-band, and an arrangement pattern of column vectors corresponding to the first pre-coding matrix.

The pre-coding module 605 is configured to pre-code data to be transmitted over the physical resource in the first sub-band, using the second pre-coding matrix corresponding to the physical resource according to the second pre-coding matrix.

In one embodiment, the second determining module 603 can be configured to determine the first pre-coding matrix in the first sub-band according to a Pre-coding Matrix Indicator (PMI) in the first sub-band, in the received CSI fed back by the terminal.

In one embodiment, the extending module 604 can be configured to determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

In one embodiment, the i-th physical resource in the first sub-band corresponds to the k-th arrangement pattern of column vectors corresponding to the first pre-coding matrix, where:

k=i mod K, where i=0, 1, 2 ... N, k=0, 1, 2, 3, ..., K−1, K is the number of arrangement patterns of column vectors corresponding to the first pre-coding matrix, and N is the number of physical resources in the first sub-band; or k=ceil (i/v) mod K, where ceil (i/v) represents the minimum integer no less than i/v, v=RI, or v is the number of antenna ports, i=0, 1, 2 ... N, k=0, 1, 2, 3, ..., K−1, K is the number of arrangement patterns of column vectors corresponding to the first pre-coding matrix, and N is the number of physical resources in the first sub-band.

In one embodiment, the first sub-band includes one or more PRBs.

The second sub-band is the same as the first sub-band; or the second sub-band includes a plurality of first sub-bands.

Based upon the same technical idea, another embodiment of the invention further provides a terminal, and the terminal can perform the flow above of feeding back CSI at the terminal side.

Figure 7:
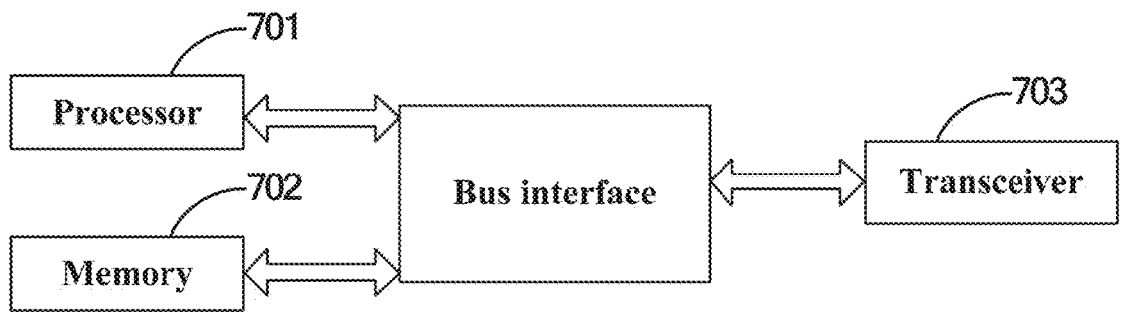
FIG. 7 is a schematic structural diagram of a terminal according to another embodiment of the invention.

Referring to FIG. 7 which is a schematic structural diagram of a terminal according to an embodiment of the invention. The terminal can perform the flow above of feeding back CSI at the terminal side. As illustrated, the terminal can include a processor 701, a memory 702, a transceiver 703, and a bus interface.

The processor 701 is responsible for managing a bus architecture and performing normal processes, and the memory 702 can store data for use by the processor 701 in performing operations. The transceiver 703 is configured to be controlled by the processor 701 to receive and transmit data.

The bus architecture can include any number of interconnecting buses and bridges to particularly link together various circuits including one or more processors represented by the processor 701, and one or more memories represented by the memory 702. The bus architecture can further link together various other circuits, e.g., a peripheral device, a manostat, a power management circuit, etc., all of which are well known in the art, so a further description thereof will be omitted in this context. The bus interface serves as an interface. The processor 701 is responsible for managing the bus architecture and performing normal processes, and the memory 702 can store data for use by the processor 701 in performing operations.

The flow according to the embodiment of the invention can be applied to the processor 701, or performed by the processor 701. In an implementation, the respective steps in the flow of processing a signal can be performed by integrated logic circuits in hardware, or instructions in software, in the processor 701. The processor 701 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a micro processor, or can be any conventional processor, etc. The steps in the method according to the embodiment of the invention can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 702, and the processor 701 reads the information in the memory 702, and performs the steps in the flow of processing a signal, in combination with the hardware thereof.

Particularly, the processor 701 can be configured to read and execute the program in the memory 702:

to determine a first pre-coding matrix in a first sub-band;

to determine a second pre-coding matrix corresponding to a physical resource in the first sub-band according to the first pre-coding matrix, and an arrangement pattern of column vectors corresponding to the first pre-coding matrix:

to determine a Channel Quality Indicator (CQI) in a second sub-band according to the second pre-coding matrix; and to feed back CSI including the CQI.

Reference can be made to the embodiment above for a particular implementation of the flow above of feeding back CSI, so a repeated description thereof will be omitted here.

Based upon the same technical idea, another embodiment of the invention further provides a base station, and the base station can perform the flow above of pre-coding at the base station side.

Figure 8:
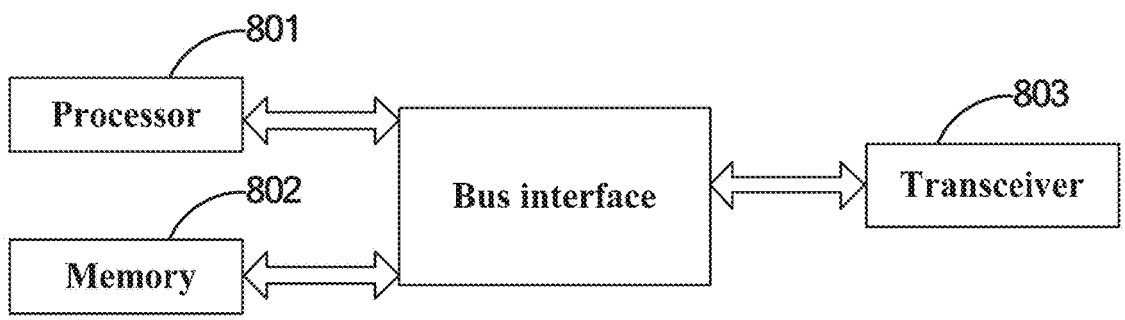
FIG. 8 is a schematic structural diagram of a base station according to another embodiment of the invention.

Referring to FIG. 8 which is a schematic structural diagram of a base station according to an embodiment of the invention. The base station can perform the flow above of pre-coding at the base station side. As illustrated, the base station can include a processor 801, a memory 802, a transceiver 803, and a bus interface.

The processor 801 is responsible for managing a bus architecture and performing normal processes, and the memory 802 can store data for use by the processor 801 in performing operations. The transceiver 803 is configured to be controlled by the processor 801 to receive and transmit data.

The bus architecture can include any number of interconnecting buses and bridges to particularly link together various circuits including one or more processors represented by the processor 801, and one or more memories represented by the memory 802. The bus architecture can further link together various other circuits, e.g., a peripheral device, a manostat, a power management circuit, etc., all of which are well known in the art, so a further description thereof will be omitted in this context. The bus interface serves as an interface. The processor 801 is responsible for managing the bus architecture and performing normal processes, and the memory 802 can store data for use by the processor 801 in performing operations.

The flow according to the embodiment of the invention can be applied to the processor 801, or performed by the processor 801. In an implementation, the respective steps in the flow of processing a signal can be performed by integrated logic circuits in hardware, or instructions in software, in the processor 801. The processor 801 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a micro processor, or can be any conventional processor, etc. The steps in the method according to the embodiment of the invention can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 802, and the processor 801 reads the information in the memory 802, and performs the steps in the flow of processing a signal, in combination with the hardware thereof.

Particularly, the processor 801 can be configured to read and execute the program in the memory 802:

to receive Channel State Information (CSI) fed back by a terminal, where the CSI includes a Channel Quality Indicator (CQI) in a second sub-band:

to determine a modulation and coding scheme for downlink transmission according to the CQI;

to determine a first pre-coding matrix in a first sub-band;

to determine a second pre-coding matrix corresponding to a physical resource in the first sub-band according to the first pre-coding matrix in the first sub-band, and an arrangement pattern of column vectors corresponding to the first pre-coding matrix; and to pre-code data to be transmitted over the physical resource in the first sub-band, using the second pre-coding matrix corresponding to the physical resource according to the second pre-coding matrix.

Reference can be made to the embodiment above for a particular implementation of the flow above of pre-coding, so a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for feeding back Channel State Information (CSI), the method comprising:
   determining, by a terminal, a first pre-coding matrix in a first sub-band;
   determining, by the terminal, a second pre-coding matrix corresponding to a physical resource in the first sub-band according to the first pre-coding matrix, and an arrangement pattern of column vectors corresponding to the first pre-coding matrix;
   determining, by the terminal, a Channel Quality Indicator (CQI) in a second sub-band according to the second pre-coding matrix corresponding to the physical resource in the first sub-band; and
   feeding back, by the terminal, CSI comprising the CQI.

2. The method according to claim 1, wherein the determining, by the terminal, the Channel Quality Indicator (CQI) in the second sub-band according to the second pre-coding matrix corresponding to the physical resource in the first sub-band comprises:
   determining, by the terminal, a second pre-coding matrix corresponding to a physical resource in the second sub-band according to the second pre-coding matrix corresponding to the physical resource in the first sub-band, wherein one physical resource corresponds to one second pre-coding matrix; and
   determining, by the terminal, a CQI in the second sub-band according to the second pre-coding matrix corresponding to the physical resource in the second sub-band.

3. The method according to claim 1, wherein the determining, by the terminal, the second pre-coding matrix corresponding to the physical resource in the first sub-band according to the first pre-coding matrix, and the arrangement pattern of column vectors corresponding to the first pre-coding matrix comprises:
   determining, by the terminal, the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

4. The method according to claim 3, wherein the correspondence relationship between an arrangement pattern of column vectors corresponding to the first pre-coding matrix, and a physical resource in the first sub-band is that:
   an i-th physical resource in the first sub-band corresponds to a k-th arrangement pattern of column vectors corresponding to the first pre-coding matrix, wherein:
   k=i mod K, wherein i=0, 1, 2 . . . N, k=0, 1, 2, 3, . . . , K−1, K is the number of arrangement patterns of column vectors corresponding to the first pre-coding matrix, and N is the number of physical resources in the first sub-band; or
   k=ceil (i/v) mod K, wherein ceil (i/v) represents the minimum integer no less than i/v, v=RI, or v is the number of antenna ports, i=0, 1, 2 . . . N, k=0, 1, 2, 3, . . . , K−1, K is the number of arrangement patterns of column vectors corresponding to the first pre-coding matrix, and N is the number of physical resources in the first sub-band.

5. The method according to claim 1, wherein the first sub-band comprises one or more Physical Resource Blocks (PRBs); and
   the second sub-band is same as the first sub-band; or the second sub-band comprises a plurality of first sub-bands.

6. The method according to claim 1, wherein for K second pre-coding matrixes obtained in K arrangement patterns of column vectors corresponding to a first pre-coding matrix, column vectors, corresponding to a same data stream, in the different second pre-coding matrixes comprises all column vectors in the first pre-coding matrix.

7. A pre-coding method, comprising:
receiving, by a base station, Channel State Information (CSI) fed back by a terminal, wherein the CSI comprises a Channel Quality Indicator (CQI) in a second sub-band;
determining, by the base station, a modulation and coding scheme for downlink transmission according to the CQI;
determining, by the base station, a first pre-coding matrix in a first sub-band;
determining, by the base station, a second pre-coding matrix corresponding to a physical resource in the first sub-band according to the first pre-coding matrix in the first sub-band, and an arrangement pattern of column vectors corresponding to the first pre-coding matrix; and
pre-coding, by the base station, data to be transmitted over the physical resource in the first sub-band, using the second pre-coding matrix corresponding to the physical resource according to the second pre-coding matrix.

8. The method according to claim 7, wherein determining, by the base station, the second pre-coding matrix corresponding to the physical resource in the first sub-band according to the first pre-coding matrix in the first sub-band, and the arrangement pattern of column vectors corresponding to the first pre-coding matrix comprises:
determining, by the base station, the second pre-coding matrix corresponding to the physical resource in the first sub-band according to the first pre-coding matrix in the first sub-band, and the correspondence relationship between an arrangement pattern of column vectors corresponding to the first pre-coding matrix, and a physical resource in the first sub-band.

9. The method according to claim 8, wherein the correspondence relationship between an arrangement pattern of column vectors corresponding to the first pre-coding matrix, and a physical resource in the first sub-band is that:
an i-th physical resource in the first sub-band corresponds to a k-th arrangement pattern of column vectors corresponding to the first pre-coding matrix, wherein:
k=i mod K, wherein i=0, 1, 2 ... N, k=0, 1, 2, 3, ..., K−1, K is the number of arrangement patterns of column vectors corresponding to the first pre-coding matrix, and N is the number of physical resources in the first sub-band; or
k=ceil(i/v) mod K, wherein ceil(i/v) represents the minimum integer no less than i/v, v=RI, or v is the number of antenna ports, i=0, 1, 2 ... N, k=0, 1, 2, 3, ..., K−1, K is the number of arrangement patterns of column vectors corresponding to the first pre-coding matrix, and N is the number of physical resources in the first sub-band.

10. The method according to claim 7, wherein for K second pre-coding matrixes obtained in K arrangement patterns of column vectors corresponding to a first pre-coding matrix, column vectors, corresponding to a same data stream, in the different second pre-coding matrixes comprises all the column vectors in the first pre-coding matrix.

11. The method according to claim 7, wherein determining, by the base station, the first pre-coding matrix in the first sub-band comprises:
determining, by the base station, the first pre-coding matrix in the first sub-band according to a Pre-coding Matrix Indicator (PMI) in the first sub-band, in the received CSI fed back by the terminal.

12. The method according to claim 7, wherein the first sub-band comprises one or more Physical Resource Blocks (PRBs); and
the second sub-band is same as the first sub-band; or the second sub-band comprises a plurality of first sub-bands.

13. A terminal, comprising a processor, a memory, a transceiver, and a bus interface, wherein:
the processor is configured to read and execute program in the memory:
to determine a first pre-coding matrix in a first sub-band;
to determine a second pre-coding matrix corresponding to a physical resource in the first sub-band according to the first pre-coding matrix, and an arrangement pattern of column vectors corresponding to the first pre-coding matrix;
to determine a Channel Quality Indicator (CQI) in a second sub-band according to the second pre-coding matrix corresponding to the physical resource in the first sub-band; and
to feed back CSI comprising the CQI.

14. The terminal according to claim 13, wherein the processor is further configured to read and execute program in the memory:
to determine a second pre-coding matrix corresponding to a physical resource in the second sub-band according to the second pre-coding matrix corresponding to the physical resource in the first sub-band, wherein one physical resource corresponds to one second pre-coding matrix; and
to determine a CQI in the second sub-band according to the second pre-coding matrix corresponding to the physical resource in the second sub-band.

15. The terminal according to claim 13, wherein the processor is further configured to read and execute program in the memory: to determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

16. The terminal according to claim 15, wherein an i-th physical resource in the first sub-band corresponds to a k-th arrangement pattern of column vectors corresponding to the first pre-coding matrix, wherein:
k=i mod K, wherein i=0, 1, 2 ... N, k=0, 1, 2, 3, ..., K−1, K is the number of arrangement patterns of column vectors corresponding to the first pre-coding matrix, and N is the number of physical resources in the first sub-band; or
k=ceil(i/v) mod K, wherein ceil(i/v) represents the minimum integer no less than i/v, v=RI, or v is the number of antenna ports, i=0, 1, 2 ... N, k=0, 1, 2, 3, ..., K−1, K is the number of arrangement patterns of column vectors corresponding to the first pre-coding matrix, and N is the number of physical resources in the first sub-band.

17. The terminal according to claim 13, wherein the first sub-band comprises one or more Physical Resource Blocks (PRBs); and
the second sub-band is same as the first sub-band; or the second sub-band comprises a plurality of first sub-bands.

18. The terminal according to claim 13, wherein for K second pre-coding matrixes obtained in K arrangement patterns of column vectors corresponding to a first pre-coding matrix, column vectors, corresponding to a same data stream, in the different second pre-coding matrixes comprises all the column vectors in the first pre-coding matrix.

19. A base station, comprising a processor, a memory, a transceiver, and a bus interface, wherein:
the processor is configured to read and execute program in the memory:
to receive Channel State Information (CSI) fed back by a terminal, wherein the CSI comprises a Channel Quality Indicator (CQI) in a second sub-band;
to determine a modulation and coding scheme for downlink transmission according to the CQI;
to determine a first pre-coding matrix in a first sub-band;
to determine a second pre-coding matrix corresponding to a physical resource in the first sub-band according to the first pre-coding matrix in the first sub-band, and an arrangement pattern of column vectors corresponding to the first pre-coding matrix; and
to pre-code data to be transmitted over the physical resource in the first sub-band, using the second pre-coding matrix corresponding to the physical resource according to the second pre-coding matrix.

20. The base station according to claim 19, wherein the processor is further configured to read and execute program in the memory to determine the first pre-coding matrix in the first sub-band according to a Pre-coding Matrix Indicator (PMI) in the first sub-band, in the received CSI fed back by the terminal.

21. The base station according to claim 19, wherein the processor is further configured to read and execute program in the memory to determine the second pre-coding matrix corresponding to the physical resource in the first sub-band according to the first pre-coding matrix in the first sub-band, and a correspondence relationship between an arrangement pattern of column vectors corresponding to the first pre-coding matrix, and a physical resource in the first sub-band.

22. The base station according to claim 19, wherein an i-th physical resource in the first sub-band corresponds to a k-th arrangement pattern of column vectors corresponding to the first pre-coding matrix, wherein:
k=i mod K, wherein i=0, 1, 2 . . . N, k=0, 1, 2, 3, . . . , K−1, K is the number of arrangement patterns of column vectors corresponding to the first pre-coding matrix, and N is the number of physical resources in the first sub-band; or
k=ceil(i/v) mod K, wherein ceil(i/v) represents the minimum integer no less than i/v, v=RI, or v is the number of antenna ports, i=0, 1, 2 . . . N, k=0, 1, 2, 3, . . . , K−1, K is the number of arrangement patterns of column vectors corresponding to the first pre-coding matrix, and N is the number of physical resources in the first sub-band.

23. The base station according to claim 19, wherein the first sub-band comprises one or more Physical Resource Blocks (PRBs); and
the second sub-band is same as the first sub-band; or the second sub-band comprises a plurality of first sub-bands.

* * * * *